United States Patent
Branton

(10) Patent No.: US 10,581,591 B1
(45) Date of Patent: Mar. 3, 2020

(54) PROBABILISTIC SECONDARY TOKEN ISSUANCE ON A BLOCKCHAIN BASED ON BURNING OF A PRIMARY TOKEN OF THE BLOCKCHAIN

(71) Applicant: Matthew Branton, New York, NY (US)

(72) Inventor: Matthew Branton, New York, NY (US)

( * ) Notice: Subject to any disclaimer, the term of this patent is extended or adjusted under 35 U.S.C. 154(b) by 152 days.

(21) Appl. No.: 15/794,644

(22) Filed: Oct. 26, 2017

Related U.S. Application Data

(60) Provisional application No. 62/573,483, filed on Oct. 17, 2017.

(51) Int. Cl.
| | |
|---|---|
| *H04L 29/06* | (2006.01) |
| *H04L 9/06* | (2006.01) |
| *H04L 9/08* | (2006.01) |
| *H04L 9/32* | (2006.01) |

(52) U.S. Cl.
CPC .......... *H04L 9/0637* (2013.01); *H04L 9/0822* (2013.01); *H04L 9/3213* (2013.01)

(58) Field of Classification Search
CPC .... H04L 9/0637; H04L 9/0822; H04L 9/3213
See application file for complete search history.

(56) References Cited

U.S. PATENT DOCUMENTS

| | | | |
|---|---|---|---|
| 2007/0174341 A1* | 7/2007 | Saripalli | G06Q 30/0603 |
| 2015/0324764 A1* | 11/2015 | Van Rooyen | G06Q 20/3276 705/69 |
| 2016/0012424 A1* | 1/2016 | Simon | G06Q 20/3674 705/67 |
| 2016/0358161 A1* | 12/2016 | Cobban | G06Q 30/0201 |
| 2017/0104831 A1* | 4/2017 | Fransen | H04L 67/148 |
| 2017/0134937 A1* | 5/2017 | Miller | G06Q 20/3829 |
| 2018/0068130 A1* | 3/2018 | Chan | G06F 21/6227 |
| 2018/0075534 A1* | 3/2018 | de Fouquieres | G06Q 40/06 |
| 2018/0204191 A1* | 7/2018 | Wilson | G06Q 20/3829 |
| 2018/0241573 A1* | 8/2018 | Ramathal | G16H 10/60 |
| 2019/0020480 A1* | 1/2019 | Camenisch | H04L 9/3221 |
| 2019/0028276 A1* | 1/2019 | Pierce | H04L 9/3234 |
| 2019/0058592 A1* | 2/2019 | Wright | G06N 7/00 |

* cited by examiner

*Primary Examiner* — Ghodrat Jamshidi
(74) *Attorney, Agent, or Firm* — Pillsbury Winthrop Shaw Pittman, LLP

(57) ABSTRACT

In certain embodiments, probabilistic secondary token issuance on a blockchain may be facilitated based on a burning of a primary token of the blockchain. In some embodiments, a blockchain transaction associated with a user may be obtained. The blockchain transaction may indicate (i) an amount of a primary token of the blockchain (owned by the user) to be burned and (ii) a secondary token of the blockchain. Based on the blockchain transaction, (i) the amount of the primary token may be burned, and (ii) a portion of a key space may be allocated to the user. Based on a determination that a hash of at least a portion of a first block of the blockchain corresponds to the key space portion allocated to the user, an issuance of an amount of the secondary token to the user may be stored on a second block for the blockchain.

16 Claims, 4 Drawing Sheets

Blockchain 200

Block 202

[Transaction information 222a and/or cryptographic version thereof]
[Transaction information 222b and/or cryptographic version thereof]
...
[Transaction information 222n and/or cryptographic version thereof]

Block 204

[Transaction information 224a and/or cryptographic version thereof]
[Transaction information 224b and/or cryptographic version thereof]
...
[Transaction information 224n and/or cryptographic version thereof]

Block 206

[Transaction information 226a and/or cryptographic version thereof]
[Transaction information 226b and/or cryptographic version thereof]
...
[Transaction information 226n and/or cryptographic version thereof]

PROBABILISTIC SECONDARY TOKEN ISSUANCE ON A BLOCKCHAIN BASED ON BURNING OF A PRIMARY TOKEN OF THE BLOCKCHAIN

RELATED APPLICATIONS

This application claims the benefit of U.S. Provisional Patent Application Ser. No. 62/573,483, filed on Oct. 17, 2017, entitled "Probabilistic Secondary Token Issuance on a Blockchain Based on Burning of a Primary Token of the Blockchain," which is hereby incorporated by reference herein in its entirety.

FIELD OF THE INVENTION

The invention relates to secondary token issuance on a blockchain (or other ledger), including, for example, secondary token issuance on a blockchain based on multiple users' transactions related to burning of their respective amounts of primary token of the blockchain, secondary token issuance on a blockchain based on a hash of a block (or portion thereof), etc.

BACKGROUND OF THE INVENTION

Bitcoin is generally regarded as the first modern cryptocurrency. It is the first publicly used means of exchange that combines decentralized control, user anonymity, record-keeping via a blockchain and built-in scarcity. Shortly thereafter, as with all new technologies, iterations of the cryptocurrency and applications of the blockchain began to develop. This includes the Ethereum blockchain—a custom blockchain designed to facilitate smart contracts software protocols configured to operate in distributed networks. Bitcoin (and other blockchain or distributed ledgers networks), however, have issues related to scalability. In addition, given its proof-of-work design, mining in Bitcoin requires the consumption of large amounts of real-world computational resources (e.g., electricity, computer hardware, etc.). These and other drawbacks exist.

SUMMARY OF THE INVENTION

Aspects of the invention relate to methods, apparatuses, and/or systems for facilitating secondary token issuance on a blockchain.

In some embodiments, in lieu of the consumption of large amounts of real-world resources in exchanging for mining Bitcoin of the Bitcoin blockchain (or other primary tokens of other blockchains or ledgers), mining of one or more secondary tokens of a blockchain may mimic the process of Bitcoin mining (or other primary token mining) via a probabilistic issuance of one or more amounts of the secondary tokens that is based on a burning of a primary token of the blockchain (or other transaction or event).

In some embodiments, issuance of an amount of a secondary token of a blockchain to a user may be based on one or more amounts of a primary token (of the blockchain) indicated in one or more blockchain transactions as amounts to be burned (e.g., via a proof-of-burn technique) or transferred to another user. As an example, an issuance of a particular amount of the secondary token to a first user may be based on (i) a first amount of the primary token owned by the first user (that is indicated in a first blockchain transaction as an amount to be burned or transferred to another user), (ii) a second amount of the primary token owned by a second user (that is indicated in a second blockchain transaction as an amount to be burned or transferred to another user), (iii) a third amount of the primary token owned by a third user (that is indicated in a third blockchain transaction as an amount to be burned or transferred to another user), and (iv) so on.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIG. 2 shows a blockchain, blocks of the blockchain, and transactions stored on the blockchain, in accordance with one or more embodiments.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
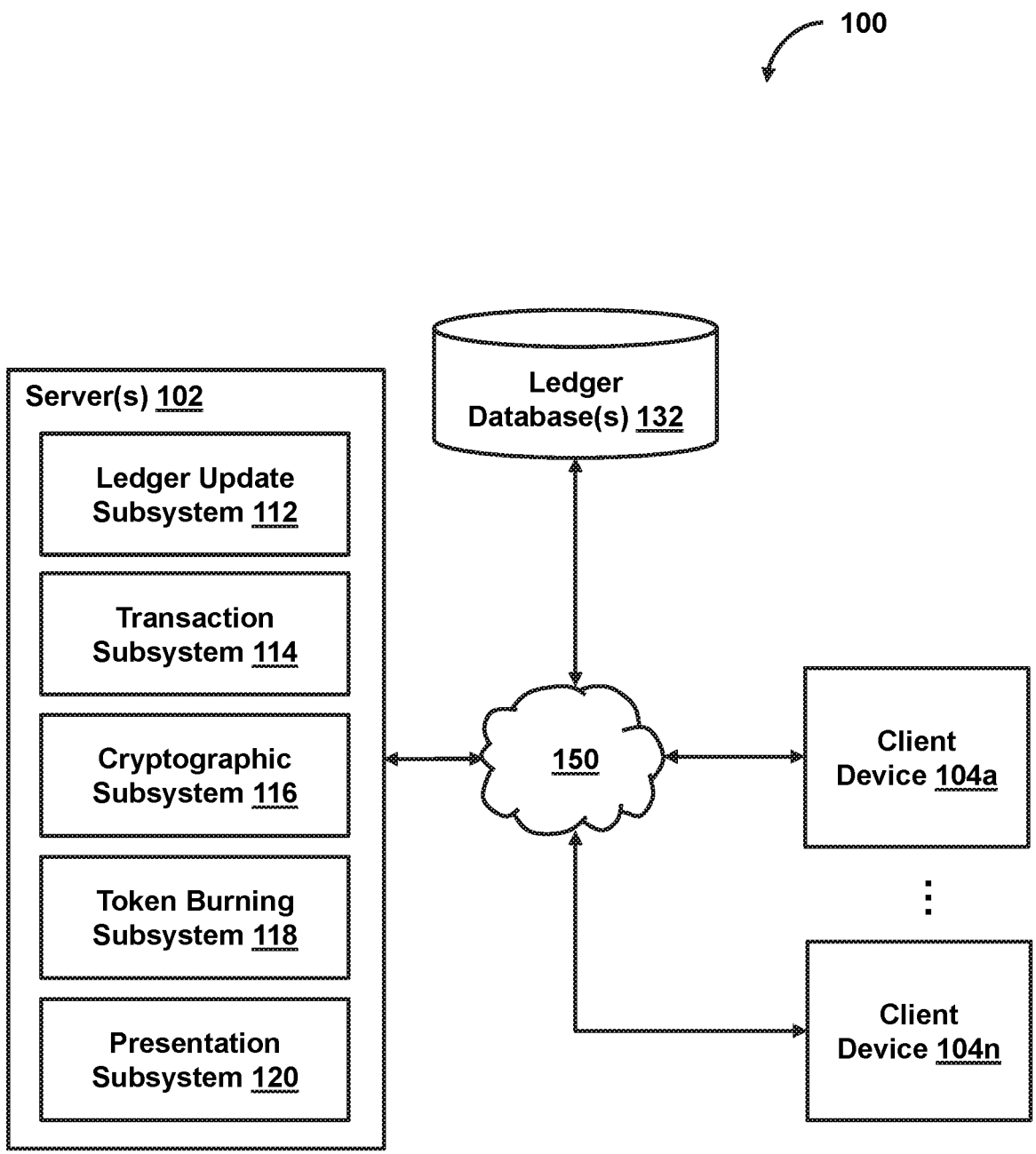
FIG. 1 shows a system for facilitating secondary token issuance on a blockchain (or other ledger), in accordance with one or more embodiments.

FIG. 1 shows a system for facilitating secondary token issuance on a blockchain (or other ledger), in accordance with one or more embodiments. As shown in FIG. 1, system 100 may include server(s) 102, client device 104 (or client devices 104a-104n), or other components. Server 102 may include ledger update subsystem 112, transaction subsystem 114, cryptographic subsystem 116, token burning subsystem 118, presentation subsystem 120, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of server 102, those operations may, in some embodiments, be performed by other components of server 102 or other components of system 100. As an example, while one or more operations are described herein as being performed by components of server 102, those operations may, in some embodiments, be performed by components of client device 104. In one use case, for instance, one or more servers 102 or client devices 104 may each be a network node that comprises subsystems 112-120 or other components. It should be noted that, although some embodiments herein describe features with respect to Bitcoin or Ethereum, such features may in other embodiments be apply to other digital currencies as well as other blockchain or other ledger technologies.

In some embodiments, system 100 may facilitate second token issuance on a decentralized and distributed digital ledger (e.g., a decentralized blockchain or other decentralized ledger) used to record transactions across many computer systems associated with different entities in such a way that the record cannot be altered retroactively without the alteration of all subsequent blocks and the collusion of the network. The use of a blockchain (or other such ledger) removes the characteristic of infinite reproducibility from a digital asset, and confirms that each unit of value was transferred only once, thereby solving the long-standing problem of double spending. As shown in FIG. 2, a blockchain (e.g., blockchain 200) may include blocks (e.g., blocks 202, 204, and 206) and transactions (e.g., transaction information 222, transaction information 224, transaction information 226, or cryptographic versions thereof). Each block may hold batches of valid transactions that are hashed and encoded (e.g., into a Merkle tree or other tree). Each block may also include the hash of the immediately-prior block of the blockchain, thereby linking the two blocks. The iterative process to form the chain of blocks confirms the integrity of the previous block, all the way back to the original genesis block. By storing data across its network, the decentralized blockchain eliminates the risks that come with data being held centrally. Specifically, for example, the decentralized blockchain lacks centralized points of vulnerability that can be exploited, as well as a central point of failure that can bring down the entire network. In some embodiments, digital ledger security may include the use of public-key cryptography. In some embodiments, a public key associated with a user may be used as an address on a blockchain or other ledger. Value tokens that are sent across the ledger network may be recorded as belonging to that address (e.g., previously belonging to that address prior to a valid transaction conveying the value tokens to another user, currently belonging to that address as a result of a transaction conveying the value tokens to the user, etc.). A private key (corresponding to the public key) may be used by the user to access to the user's digital assets or otherwise interact with the blockchain (or other ledger).

In some embodiments, system 100 maintains data quality via massive database replication and computational trust across its network nodes, where no centralized "official" copy of the blockchain (or other such digital ledger described herein) exists, and no user is "trusted" more than any other user. In some embodiments, messages reporting transactions are delivered to network nodes on a best effort basis. Upon obtaining such messages, mining nodes validate the transactions, add them to the block that the mining nodes are building, and broadcast the completed block to other nodes. In some embodiments, various time-stamping schemes may be used to serialize changes on the blockchain (or other ledger). The time-stamping schemes may include proof-of-work, proof-of-stake, proof-of-burn, or other schemes.

In some embodiments, issuance of one or more amounts of one or more secondary tokens may be facilitated based on a burning of a primary token of the blockchain, a transfer of the primary token to another user, or other transaction or event. In some embodiments, issuance of an amount of a secondary token of a blockchain to a user may be based on one or more amounts of a primary token (of the blockchain) indicated in one or more blockchain transactions as amounts to be burned (e.g., via a proof-of-burn technique) or transferred to another user. As an example, an issuance of a particular amount of the secondary token to a first user may be based on (i) a first amount of the primary token owned by the first user (that is indicated in a first blockchain transaction as an amount to be burned or transferred to another user), (ii) a second amount of the primary token owned by a second user (that is indicated in a second blockchain transaction as an amount to be burned or transferred to another user), (iii) a third amount of the primary token owned by a third user (that is indicated in a third blockchain transaction as an amount to be burned or transferred to another user), and (iv) so on. In one use case, with respect to the amounts to be transferred to another user, the other user(s) (to which the amounts of the primary token owned by the first user, second user, and third user are transferred) are not any of the foregoing transferring users. It should be noted that, although some embodiments herein describe features that are based on a burning of an amount of a primary token, such features may in other embodiments be additionally or alternatively based on a transfer of an amount of the primary token to another user (or other transaction or event).

In some embodiments, issuance of an amount of a secondary token of a blockchain to a user may include a probabilistic issuance of the amount of the secondary token. In one use case, with respect to Ethereum, Alice submits a mining attempt at 0.1 Ether (e.g., at least some portion of which will be burned for the mining attempt), and Bob submits a mining attempt at 0.3 Ether (e.g., at least some portion of which will be burned for the mining attempt). A first number of units from a set of units may be allocated to Alice based on Alice's submission of 0.1 Ether, and a second number of units from the set of units may be allocated to Bob based on Bob's submission of 0.3 Ether. One or more matchable units may be selected from the set of units. In some embodiments, the selection of units or the allocation of units may be a random selection or allocation. If Alice's allocated units matches the randomly-selected units, an amount of the secondary token may be issued to Alice. If Bob's allocated units matches the randomly-selected units, an amount of the secondary token may be issued to Bob. In some embodiments, the random selection or random allocation of units may be a pseudorandom selection or allocation (e.g., by executing an RdRand instruction and applying a seed value or performing other pseudorandom techniques).

In some embodiments, an amount of a secondary token of a blockchain that is issued to a user may be based on a difficulty level for issuance of new units of the secondary token. In one use case, with respect to Ethereum, at mining difficulty 1, the difficulty may be set to 1 Ether. Alice submits a mining attempt at 0.1 Ether (e.g., at least some portion of which will be burned for the mining attempt), and Bob submits a mining attempt at 0.3 Ether (e.g., at least some portion of which will be burned for the mining attempt), resulting in 0.6 Ether worth of work that is not allocated. A first number of units from a set of units may be allocated to Alice based on Alice's submission of 0.1 Ether being 10% of the difficulty level, and a second number of units from the set of units may be allocated to Bob based on Bob's submission of 0.3 Ether being 30% of the difficulty level. One or more units may be randomly selected (e.g., pseudo-random selection) from the set of units. If Alice's allocated units matches the randomly-selected units, an amount of the secondary token may be issued to Alice. If Bob's allocated units matches the randomly-selected units, an amount of the secondary token may be issued to Bob. In another use case, where the total Ethereum committed exceeds the difficulty level (e.g., for a given issuance of the secondary token), the difficulty for the purposes of the mining/issuance calculation may be set to the summation of the total amount of Ether in the mining attempts. As an example, if Alice and Bob each submit a mining attempt at 1 Ether for a given issuance, and no other users submit a mining attempt for the given issuance, the difficulty level may be set to 2 Ether (e.g., Alice's submission and Bob's submission of 1 Ether each is then only 50% of the difficulty level).

In some embodiments, an amount of a secondary token of a blockchain that is issued to a user may be based on an allocation of a key space to the user (e.g., the real number space of the SHA-256 hash or other key space). In some embodiments, the allocation of the key space may be based on an amount of a primary token (of the blockchain) owned by user (that is indicated in a blockchain transaction as an amount to be burned or transferred to another user). In one scenario, with respect to Ethereum, each potential miner is allocated a percentage of a total key space of $2^{256}$ possibilities based on their contribution to that whole, and these contributions are mapped into the real number space of the SHA-256 hash with respect to an Ethereum block (or portion thereof). The miner whose probabilistic search range overlaps the SHA-256 hash is issued the given amount of the secondary token. For example, at mining difficulty 1, the difficulty may be set to 1 Ether. Alice submits a mining attempt at 0.1 Ether (e.g., at least some portion of which will be burned for the mining attempt), and Bob submits a mining attempt at 0.3 Ether (e.g., at least some portion of which will be burned for the mining attempt), resulting in 0.6 Ether worth of work that is not allocated. As a result, Alice searches $1/(1/0.1)=10\%$ of the key space, Bob searches $1/(1/0.3)=30\%$ of the key space, and $1/(1/0.6)=60\%$ of the key space is left unsearched. The total search guesses may be ordered sequentially based on transaction submission which provides a search range per miner. Alice searches 0 to $0.1*2^{256}$, Bob searches $0.1*2^{256}+1$ to $(0.1+0.3)*2^{256}$, and the remainder of the key space is unsearched. The hash of a given block (or a portion thereof) is computed, and compared with each participant range to determine which user is to be issued the given amount of the secondary token. In another use case, where the total Ethereum committed exceeds the difficulty level (e.g., for the given block), the difficulty for the purposes of the mining/issuance calculation may be set to the summation of the total amount of Ether in the mining attempts.

In some embodiments, ledger update subsystem 112 may store a blockchain. As an example, the blockchain may include one or more blocks. Each of the blocks may include one or more blockchain transactions. Each of the blockchain transaction may involve a primary token of the blockchain (e.g., Ether is the primary token of the Ethereum blockchain). As another example, each of the blocks may be linked to an immediate prior block of the blockchain. Each of the blocks may be secured using cryptography. In one use case, each block may contains a hash pointer as a link to an immediate prior block, a timestamp, and transaction information (related to one or more transactions), or other information. As another example, the blockchain may be obtained from one or more sources. The blockchain may be updated by obtaining one or more portions of the blockchain stored at one or more sources (e.g., by syncing the stored blockchain with the portions obtained from multiple stores, by verifying that the portions obtained from one source match corresponding portions obtained from one or more other sources, etc.).

In some embodiments, transaction subsystem 114 may obtain a blockchain transaction associated with a user. The blockchain transaction may indicate (i) an amount of a primary token of a blockchain, (ii) a secondary token of the blockchain, or (iii) other transaction information. As another example, the amount of the primary token indicated by the blockchain transaction may be owned by the user (e.g., as indicated by one or more transactions stored on one or more blocks of the blockchain). As another example, the indication of the amount of the primary token may include an identification of a fixed or non-fixed amount of the primary token to be burned (e.g., an amount randomly selected from a range of amounts at a time subsequent the time at which the blockchain transaction was originated), an indication of a fixed or non-fixed amount of the primary token to be burned (e.g., an identification of a percentage of the fixed or non-fixed amount to be burned, an identification of one or more percentages of the fixed or non-fixed amount to be allocated to one or more other users rather than being burned, etc.), or other indication. As another example, the indication of the secondary token of the blockchain may include an identification of the secondary token, an indication of an amount of the secondary token (e.g., a fixed amount of the secondary token, a non-fixed amount of the secondary token, or other amount), or other indication.

In some embodiments, based on the foregoing blockchain transaction (e.g., indicating an amount of the primary token and the secondary token), token burning subsystem 118 may cause the amount of the primary token owned by the user to be burned. If the blockchain transaction indicates a first amount of the primary token (owned by the user) to be burned, one or more proofs of burn for the first amount of the primary token owned by the user may be performed. Additionally, or alternatively, one or more user devices (e.g., of the user) may be requested to perform the proofs of burn for the first amount of the primary token. In some embodiments, based on the foregoing blockchain transaction (e.g., indicating an amount of the primary token and the secondary token), cryptographic subsystem 116 may cause an amount of the secondary token to be issued to the user. As indicated, in some embodiments, the issuance of the amount of the secondary token may be based on the amount of the primary token (indicated in the blockchain transaction as an amount to be burned). In one use case, for instance, the amount of the secondary token may be issued to the user in response to a validation of a proof-of-burn of the amount of the primary token being performed (e.g., via which the proof-of-burn is determined to be valid). Ledger update subsystem 112 may store the issuance of the amount of the secondary token on the blockchain. In some embodiments, cryptographic subsystem 116 may perform a validation of the secondary token issuance. In response to a determination that the secondary token issuance is valid, ledger update subsystem 112 may store the issuance of the amount of the secondary token on the blockchain (e.g., as a transaction in a block of the blockchain).

In some embodiments, transaction subsystem 114 may obtain a first blockchain transaction associated with a first user and a second blockchain transaction associated with a second user. The first blockchain transaction may indicate (i) a first amount of a primary token of a blockchain, (ii) a secondary token of the blockchain, or (iii) other transaction information. The second blockchain transaction may indicate (i) a second amount of the primary token, (ii) the secondary token, or (iii) other transaction information. As an example, the first amount of the primary token indicated by the first blockchain transaction may be owned by the first user, and the second amount of the primary token indicated by the second blockchain transaction may be owned by the second user. In some embodiments, based on the foregoing blockchain transactions, token burning subsystem 118 may cause the first amount of the primary token (e.g., owned by the first user) to be burned and the second amount of the primary token (e.g., owned by the second user) to be burned.

In some embodiments, based on the foregoing blockchain transactions, cryptographic subsystem 116 may cause an amount of the secondary token to be issued to the first user; however, although the issuance of the amount of the secondary token to the first user occurred from the first blockchain transaction, no issuance of the secondary token to the second user occurs from the second blockchain transaction. In one scenario, with respect to Ethereum, Alice submits a mining attempt at 0.1 Ether (e.g., at least some portion of which will be burned for the mining attempt), and Bob submits a mining attempt at 0.3 Ether (e.g., at least some portion of which will be burned for the mining attempt). A first number of units from a set of units may be allocated to Alice based on Alice's submission of 0.1 Ether, and a second number of units from the set of units may be allocated to Bob based on Bob's submission of 0.3 Ether. One or more units may be randomly selected from the set of units. In response to Alice's allocated units matching the randomly-selected units, and Bob's allocated units not matching the randomly-selected units, an amount of the secondary token may be issued to Alice, but no amount of the secondary token may be issued to Bob. In a further scenario, only one of the allocated units may match the randomly-selected units (e.g., for secondary token issuance purposes), thereby resulting in at most either Alice or Bob being allocated some amount of the secondary token from their aggregated mining attempt submissions (e.g., and from their aggregated amounts of the primary token being burned).

In some embodiments, based on the foregoing blockchain transactions, cryptographic subsystem 116 may cause a first amount of the secondary token to be issued to the first user and a second amount of the secondary token to be issued to the second user. In some embodiments, ledger update subsystem 112 may store the issuances of the first and second amounts of the secondary token on the blockchain. In some embodiments, the first and second amounts of the secondary token may be different from one another, while the first and second amounts of the primary token respectively indicated in the first and second blockchain transactions may be the same as one another. As an example, even if the same amounts of the first and second users' primary token are burned, they may be issued different amounts of the secondary token respectively as a result of the first and second blockchain transactions. In one use case, for example, Alice submits a mining attempt at 0.1 Ether (e.g., where 0.1 Ether is burned), and Bob submits a mining attempt at 0.3 Ether (e.g., where 0.3 Ether is burned). A first number of units from a set of units may be allocated to Alice based on Alice's submission of 0.1 Ether, and a second number of units from the set of units may be allocated to Bob based on Bob's submission of 0.3 Ether. One or more units may be randomly selected from the set of units. In response to Alice's allocated units matching the randomly-selected units, and Bob's allocated units not matching the randomly-selected units, a first amount of the secondary token may be issued to Alice, and a second amount of the secondary token may be issued to Bob. As an example, given that Alice's allocated units matched the randomly-selected units (e.g., "winning" the probabilistic selection), Alice may be issued a greater amount of the secondary token, but Bob may still be issued some non-zero amount of the secondary token (albeit, a lesser amount as compared to the greater amount issued to Alice). Alternatively, as another example, given that Bob's allocated units did not matched the randomly-selected units (e.g., "winning" the "reverse" probabilistic selection), Bob may be issued a greater amount of the secondary token, but Alice may still be issued some non-zero amount of the secondary token (albeit, a lesser amount as compared to the greater amount issued to Bob). In a further use case, the issuances of the amounts of the secondary token to Alice and Bob may respectively be in response to validations of proof-of-burns of the first and second amounts of the primary token being performed (e.g., via which the proof-of-burns are determined to be valid).

In some embodiments, transaction subsystem 114 may obtain one or more blockchain transactions during a secondary token mining window that periodically occurs in relation to a number of solved blocks, where each of the blockchain transactions indicate (i) an amount of a primary token (of a blockchain) owned by a user, (ii) a secondary token of the blockchain that is desired by the user, or (iii) other transaction information. As an example, each of the blockchain transaction may specify burning of a respective amount of the primary token (e.g., for a probabilistic issuance of the secondary token). In some embodiments, with respect to each blockchain transaction, transaction subsystem 114 may allocate a portion of a key space to the user that owned the amount of the primary token indicated in the blockchain transaction. In some embodiments, cryptographic subsystem 116 may compute a hash of a given block (or a portion thereof) of the blockchain (or otherwise obtain the hash of the block/block portion). As an example, the content of the block may be provided as input to a one-way hash function (e.g., stored in a secure memory within the cryptographic subsystem 116 or otherwise accessible to the cryptographic subsystem 116) and obtain the hash from the one-way hash function. In response to a determination that the hash of the block corresponds to a key space portion allocated to a particular user, an amount of the secondary token may be issued to that user. In one use case, for example, each secondary token issuance may be based on the SHA-256 hash of the Ethereum root state tree hash 51 blocks past the block mining window in the future (e.g., roughly 10 minutes' worth of Ethereum block creation). It should be noted that, in other use cases, other cryptographic hash algorithms (other than SHA-256) may be utilized (e.g., SHA-512 or other algorithm), and other number of blocks (other than 50 blocks) may be utilized (e.g., 10, 20, 100, or other number of blocks). Each potential miner is allocated a percentage of a total key space of $2^{256}$ possibilities based on their contribution to that whole, and these contributions are mapped into the real number space of the SHA-256 hash with respect to an Ethereum block. The miner whose probabilistic search range overlaps the SHA-256 hash is issued the given amount of the secondary token.

Bitcoineum (BTE) Applications and Embodiments

In some embodiments, Bitcoineum may be a token completely controlled by a trustless and autonomous decentralized application on the Ethereum network, the Bitcoin network, or other network. In some embodiments, Bitcoineum replicates the value semantics of Bitcoin through a novel user-centric mining algorithm while enhancing it with all of Ethereum's native capabilities or other networks' native capabilities. As an example, instead of grafting smart contracts and other advanced functionality onto the Bitcoin network, Bitcoineum may build a store of value directly into Ethereum. This new token will have desirable properties vs Ether, but maintains native interoperability and transfer capabilities on Ethereum. Further, it will have faster transaction times and lower fees than the native Bitcoin network and be the anchor for an entire ecosystem of value-preserving tokens. Such a token may have unique properties that a base currency does not. With respect to some embodiments, it is instructional to think of Bitcoineum as a modular component of a larger currency system where the token represents a fair web-minable base unit that can be used to boot-strap other functionality.

Token Distribution

Bitcoineum is a fair mined crypto token. In some embodiments, there is no ICO, there is no pre-mine, there is no founder's reward. In some embodiments, anyone with Ether can mine Bitcoineum via our novel on network mechanism, providing truly democratic access to the base token and mimicking the early days of the Bitcoin network itself. In some embodiments, Bitcoineum is a deflationary coin meant to mimic the structure of Bitcoin, while creating an open and accessible mining infrastructure. This mechanism easily support mobile mining, and can pool users together via on-chain smart contract pools. The Bitcoineum approach gives us the flexibility to create a variety of on-chain tokens, and tweak the mining and incentive structures depending on the long terms goals of any given project.

Security

In some embodiments, Bitcoineum will rely on the same security protecting 11,000,000,000+ USD in value on the Ethereum blockchain and will defer to its native capabilities. Transaction security and integrity are provided by the Ethereum network with separate probabilistic mining responsible for new coin creation up to the 21 million coin cap.

Token

In some embodiments, the Bitcoineum token will conform to the ERC20 token standard to allow interoperability between Bitcoineum and supporting Dapps. This will help create a liquid and fungible store of value, and allow sub-tokens to directly derive value via deposits. In some embodiments, these sub tokens can expand and encapsulate the Bitcoineum ERC20 token, adding additional capabilities such as zero knowledge proofs, coin mixing, and other advanced functionality as support for these technologies is added to Ethereum itself. Further, in some embodiments, Bitcoineum supports the unique Transmutable interface, a simple mechanism whereby the coin and its associated proof-of-burn can be transmuted into any token that supports the interface. This provides a seamless mechanism to trustlessly upgrade the token as Ethereum's native capabilities expand, as well as create derived crypto-currencies with unique security, privacy and other properties.

Synthetic Mining

Mining in Bitcoin is essentially a game of resource utilization and probabilities. Resources in the real world are consumed in order to increase the probability that a block will be mined. In some embodiments, Bitcoineum will replicate token mining up to the 21 million cap by introducing a game of chance that mimics this process. In some embodiments, every 50 Ethereum blocks (or other period) may unlock a new mining window opens where potential miners will compete for a Bitcoineum reward. These miners are regular users; no direct investment in hardware is needed, only a willingness on their behalf to risk Ether in a probabilistic issuance for Bitcoineum block rewards. All Ethereum consumed in this way will be burned as a mechanism of value transfer, just as if electricity had been consumed in attempting to mine a Bitcoin block. In some embodiments, the synthetic mining process can occur over a long period of time. In the case of Bitcoineum, this may happen through an increasingly difficult proof-of-burn and probabilistic game that mimics Bitcoin's structure. In some embodiments, Bitcoineum can opt to adopt a similar structure wherein the supply is slowly grown over time via on-chain mining. This creates long term stake-holders in the project, and more closely follows the growth of coins operating on their own chains. Conversely, in some embodiments, Bitcoineum may be mined over a very short period of time. This accelerated mining would more closely match what you would see in a fund raising scenario in terms of coin distribution, and would be familiar to many users.

Probabilistic Mining Issuance

In some embodiments, Bitcoineum block rewards are based on placing a monetary bet on the SHA-256 hash of the Ethereum root state tree hash 51 blocks past the block mining window in the future, roughly 10 minutes' worth of Ethereum block creation. This 256 bit hash represents the key space of $2^{256}$ possibilities. In some embodiments, the difficulty is mapped onto this key space, representing the total cost to search the entire key space. The relationship of the summation of all miner bets during the 50 block window to the total cost represents the percentage of the key space that is searched during this betting round. Each potential miner is allocated a percentage of the total key space based on their contribution to that whole, and these contributions are mapped into the real number space of the SHA-256 hash of the Ethereum root state tree. The miner whose probabilistic search range overlaps the future SHA-256 hash is rewarded with the calculated Bitcoineum block reward for that window.

In one use case, for example, at mining difficulty 1, mining difficulty is equated directly with Ether, so 1 difficulty==1 Ether. In this use case, it costs 1 Ether to search the entire $2^{256}$ key space. Alice submits a mining attempt at 0.1 Ether, Bob submits a mining attempt at 0.3 Ether, and 0.6 Ether worth of work is not allocated. As a result, Alice searches $1/(1/0.1)=10\%$ of the key space, Bob searches $1/(1/0.3)=30\%$ of the key space, and $1/(1/0.6)=60\%$ of the key space is left unsearched. The total search guesses may be ordered sequentially based on transaction submission which provides a search range per miner. Alice searches 0 to $0.1*2^{256}$, Bob searches $0.1*2^{256}+1$ to $(0.1+0.3)*2^{256}$, and the remainder of the key space is unsearched. In 51 blocks past the closing of the block window the hash of the root state is computed, and compared with each participant range to determine who gets the block reward. In the event that the total Ethereum committed exceeds the difficulty of the block, the difficulty for the purposes of the mining reward calculation is set to the summation of the bets.

$$T_{diff} = \max\ C_{diff}, \Sigma_{i=1}^{n} M_{bet} \qquad (1)$$

Where:

$T_{diff}$: Total difficulty for this mining attempt
$C_{diff}$: computed network difficulty
$M_{bet}$: miners' current bet
n: number of miners $$M_{alloc} = 1 T_{diff}/M_{bet} \qquad (2)$$

Where:

$M_{alloc}$: allocated % of total key space $T_{diff}$: total difficulty $M_{bet}$: miners current bet In some use cases, a reward table may be constructed using the above equations for any projected difficulty and use that to fairly dispense Bitcoineum.

| Miner | $M_{bet}$ | $M_{alloc}$ | Range |
|---|---|---|---|
| Alice | 0.1 | 0.1 | [0, 0.1 * k) |
| Unallocated | 0.2 | 0.2 | [ralice, ralice + (0.2 * k)) |
| Bob | 0.3 | 0.3 | [runalloc, runalloc + (0.3 * k)) |
| Kate | 0.4 | 0.4 | [rbob, rbob + (0.4 * k)] | difficulty is 1
k key space $2^{256}$
$t_{miner}$ search range for miner

Difficulty

In some embodiments, difficulty is recalculated every 120960 Ethereum blocks or 2016 Bitcoineum blocks, for a roughly two week readjustment window consistent with Bitcoin. Adjustment will be calculated based on the amount of Ether burned vs the expected valuation of this two week window, and will decrease or increase based on total wei committed. Each readjustment window is capped at a factor of 4 so that mining can pressurize/depressurize over time without being as susceptible to bursts.

$$C_{diff} \begin{cases} C_{diff} * 0.25 & \text{if}(T_{burned}/b * T_{expected}) \leq 0.25 \\ C_{diff} & \text{if } 0.25 < (T_{burned}/b * T_{expected}) \leq 4 \\ C_{diff} * 4 & \text{if}(T_{burned}/b * T_{expected})) > 4 \end{cases} \quad (3)$$

Where:

$C_{diff}$: currently difficulty $T_{burned}$: total Ethereum burned in period $T_{expected}$: total Ethereum expected in period b: number of blocks in a retargeting window Miner Reward Distribution In some embodiments, the amount of the Bitcoineum reward is set to decrease on the same schedule as Bitcoin, with a 50% reduction every 210,000 Bitcoineum blocks. The initial block reward is set to 100 Bitcoineum to offset the effects of proportional rewards. In some embodiments, only the percentage burned contribution of a winner is released per block period. For example, given two miners with equal stake in the block and a difficulty target that is met or exceeded either miner would only be entitled to 50% of the block reward. This is specifically designed to limit the attractiveness of hash grinding attacks on the Bitcoineum hash whereby a hostile miner would attempt to target a small wager. Such an attack while being extremely expensive would not yield Bitcoineum disproportionate to cost. This slows the initial monetary expansion which necessitates a higher base block reward, but also increases the value for existing holders as far as total work committed even if the reward is proportionally small.

Mining Pools

As mining progresses there will be increasing incentive to pool resources in the form of shared mining. This yields a greater chance of receiving a reward, and also increases the proportional stake of that reward. However, due to the nature of the Ethereum network, these Mining pools can be modeled as smart contracts themselves or as centralized services with enhanced user interfaces and other perks. The contract would be unnecessarily complicated by having built in pools, and that would remove any external competition for user interface or smart contract design.

Coin Limits

In some embodiments, a total of 21,000,000 Bitcoineum is to be mined on roughly the same schedule as Bitcoin, with variances due to its unique structure.

Benefits for Ethereum Holders

Bitcoineum has a similar value creation and deflationary structure as Bitcoin, making it a perfect store of value on the Ethereum network. Ether is naturally inflationary and designed for smart contract usage, making it a poor choice as a long term value store. Current owners of Ethereum can seamlessly convert into Bitcoineum as a structured safe haven asset while retaining the smart contract and network capabilities of Ethereum itself. This hybrid best of both worlds approach should greatly expand the utility of the Ethereum network for long term investors.

Benefits for Bitcoin Holders

Bitcoin has internal political risks, mining centralization risks, and possible future economically destabilizing changes as the result of corporate interests. In some embodiments, Bitcoineum can act as a hedge and additional store of value, while giving holder's access to a smart contract system that is superior to Bitcoin's current capabilities. As an autonomous application, Bitcoineum may function indefinitely without human oversight and be largely immune to the political wrangling and back-room deals that happen all too frequently in Bitcoin. Further, Bitcoineum can provide upgrades in a trustless manner, and will spawn value-derived smart tokens that have additional capabilities such as enhanced security.

Valuation

Bitcoin and Bitcoineum have different strengths and weaknesses, but their structural similarities are such that, in some embodiments, Bitcoineum may be a complete viable replacement for Bitcoin itself. In some embodiments, Bitcoineum may provide a stronger store of value than its parent currency Ether as it requires an ever increasing amount of burning to generate new coin. This ensures real digital scarcity on the Ethereum blockchain. Looking at a graph of coin creation should make Bitcoin and Bitcoineum's value clear vs long term Ether holding.

Initial Coin Offering

The Initial Coin Offering (ICO) has serious problems. ICOs have proven themselves as a mechanism to quickly and reliably raise funds for a variety of projects, but they do so while completely ignoring the regulatory and existing financial frameworks of most countries. In the US and China they represent unlicensed securities, and could expose teams to unnecessary legal risk. We present a new way of thinking about building, supporting, and financing teams creating innovative blockchain technologies. In some embodiments, the Initial Mined Offering (IMO), is a new framework for launching a token that is meant to align with existing securities regulation, while providing long term funding and incentives for new projects. A variant of the Bitcoineum synthetic mining algorithm may be leveraged to facilitate the IMO. This allows us to instantly or over time build coin distribution on chain, without issuing and selling unregulated securities.

Initial Minded Offering (IMO)

The IMO creates a proof-of-burn token, with two or more mining paths. The first allows users to destroy ether in exchange for mining power. In this instance the team never receives any Ether, since it is directly committed to the coin's mining algorithm. The other paths captures a portion of the Ether while providing equivalent or superior mining capabilities to the user, or other contribution incentives. This means that donating to the team is completely optional but incentivized. Donations through the team channel could have a slight mining advantage, a virtual boost designed to skew the proportion of coins towards those who make voluntary contributions to the team. Compare with physical mining where ASICs that have premium performance command a higher price. Rational actors are incentivized to spend where they get the best return, but doing so is completely donation based and merely affects the proportion of coins mined.

Examples Flowcharts

Figure 3:
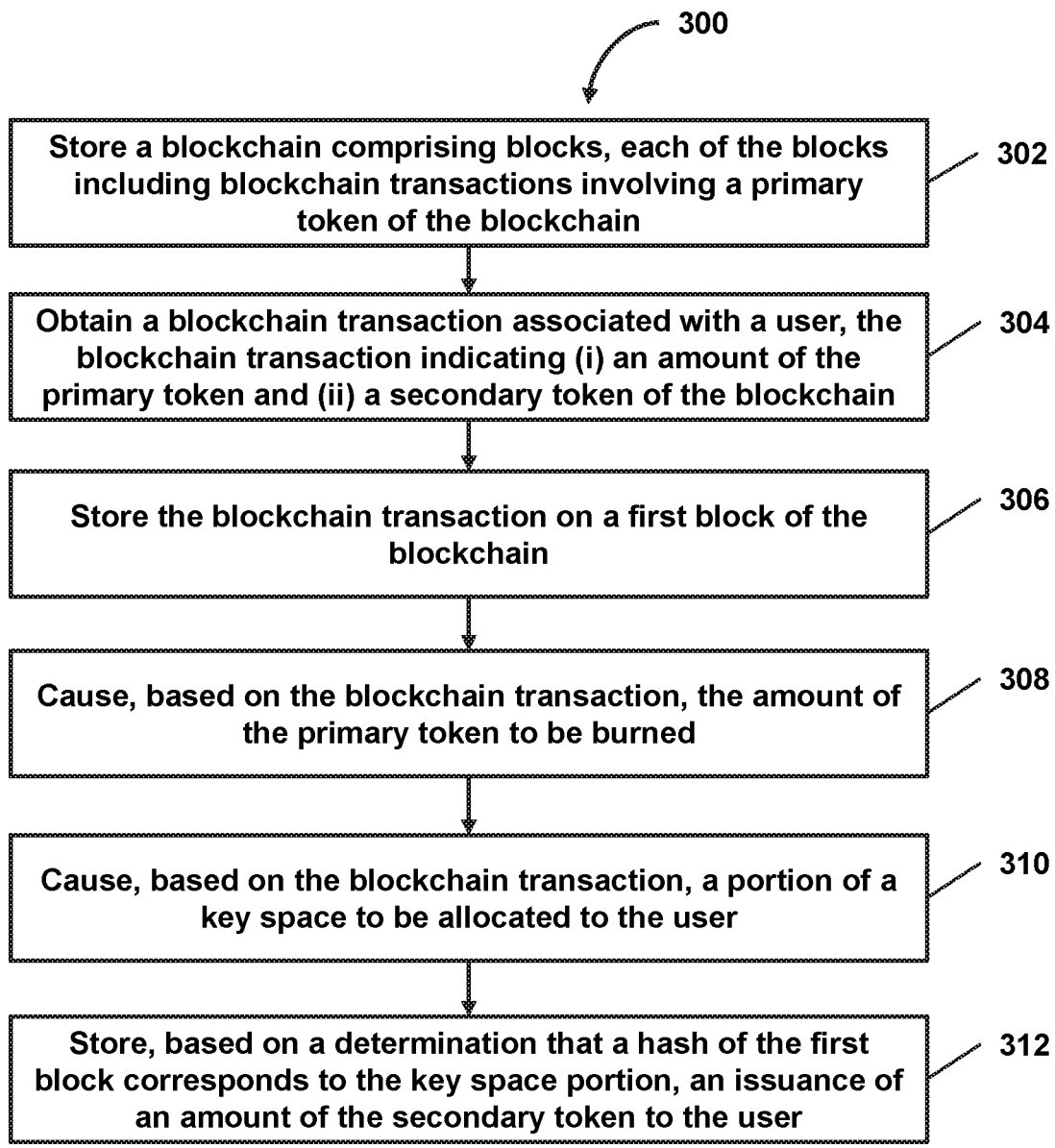
FIG. 3 shows a flowchart of a method of facilitating primary-token-burning and block-hash-based secondary token issuance on a blockchain, in accordance with one or more embodiments.
Figure 4:
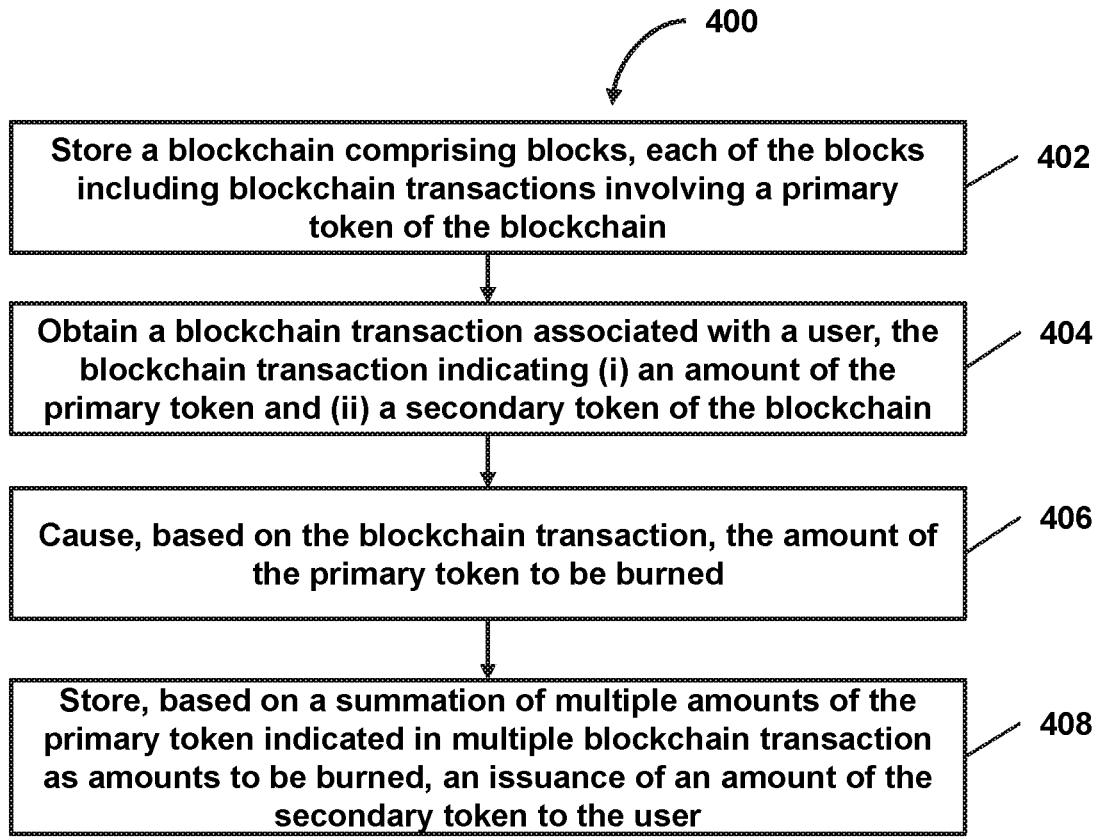
FIG. 4 shows a flowchart of a method of facilitating multiple-burning-transaction-based secondary token issuance on a blockchain, in accordance with one or more embodiments.

FIGS. 3 and 4 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 3 shows a flowchart of a method of facilitating primary-token-burning and block-hash-based secondary token issuance on a blockchain, in accordance with one or more embodiments.

In an operation 302, a blockchain may be stored. As an example, the blockchain may include one or more blocks. Each of the blocks may include one or more blockchain transactions. Each of the blockchain transaction may involve a primary token of the blockchain. As another example, each of the blocks may be linked to an immediate prior block of the blockchain. Each of the blocks may be secured using cryptography. In one use case, each block may contains a hash pointer as a link to an immediate prior block, a timestamp, and transaction information (related to one or more transactions), or other information. As another example, the blockchain may be obtained from one or more sources. The blockchain may be updated by obtaining one or more portions of the blockchain stored at one or more sources (e.g., by syncing the stored blockchain with the portions obtained from multiple stores, by verifying that the portions obtained from one source match corresponding portions obtained from one or more other sources, etc.). Operation 302 may be performed by a ledger update subsystem that is the same as or similar to ledger update subsystem 112, in accordance with one or more embodiments.

In an operation 304, a blockchain transaction associated with a user may be obtained. As an example, the blockchain transaction may indicate (i) an amount of the primary token, (ii) a secondary token of the blockchain, or (iii) other transaction information. As another example, the amount of the primary token indicated by the blockchain transaction may be owned by the user (e.g., as indicated by one or more transactions stored on one or more blocks of the blockchain). As another example, the indication of the amount of the primary token may include an identification of a fixed or non-fixed amount of the primary token to be burned (e.g., an amount randomly selected from a range of amounts at a time subsequent the time at which the blockchain transaction was originated), an indication of a fixed or non-fixed amount of the primary token to be burned (e.g., an identification of a percentage of the fixed or non-fixed amount to be burned, an identification of one or more percentages of the fixed or non-fixed amount to be allocated to one or more other users rather than being burned, etc.), or other indication. As another example, the indication of the secondary token of the blockchain may include an identification of the secondary token, an indication of an amount of the secondary token (e.g., a fixed amount of the secondary token, a non-fixed amount of the secondary token, or other amount), or other indication. Operation 304 may be performed by a transaction subsystem that is the same as or similar to transaction subsystem 114, in accordance with one or more embodiments.

In an operation 306, the blockchain transaction may be stored on a first block of the blockchain. As an example, the amount of the primary token, the secondary token, other transaction information related to the blockchain transaction, a timestamp (e.g., a time of the transaction origination, a time of a recording of the blockchain transaction on the blockchain, etc.), cryptographic information corresponding to the blockchain transaction (e.g., a hash of the transaction information of the blockchain transaction, a digital signature of the transaction information of the blockchain transaction, or other cryptographic information), or other information may be stored on the first block to represent the blockchain transaction on the blockchain. Operation 306 may be performed by a transaction subsystem that is the same as or similar to transaction subsystem 114, in accordance with one or more embodiments.

In an operation 308, the amount of the primary token (indicated by the blockchain transaction) may be caused to be burned based on the blockchain transaction. As an example, if the blockchain transaction indicates a first amount of the primary token (owned by the user) to be burned, one or more proofs of burn for the first amount of the primary token owned by the user may be performed. Additionally, or alternatively, one or more user devices (e.g., of the user) may be requested to perform the proofs of burn for the first amount of the primary token. Operation 308 may be performed by a token burning subsystem that is the same as or similar to token burning subsystem 118, in accordance with one or more embodiments.

In an operation 310, a portion of a key space may be caused to be allocated to the user based on the blockchain transaction. As an example, the key space portion may be allocated to the user based on (i) the amount of the primary token indicated in the blockchain transaction (e.g., indicated as an amount to be burned, an amount to be transferred from the user to one or more other users, etc.), (ii) one or more other amounts of the primary token indicated in one or more other blockchain transactions (e.g., indicated as amounts to be burned, amounts to be transferred from one user to one or more other users, etc.), or other criteria. As another example, one or more requests indicating the amount of the primary token may be provided to one or more other computer systems (e.g., one or more trusted nodes of a blockchain network) to cause at least one of the other computer systems to perform the allocation of the key space portion to the user. As another example, one or more other portions of the key space may be caused to be allocated to one or more other users. Operation 310 may be performed by a transaction subsystem that is the same as or similar to transaction subsystem 114, in accordance with one or more embodiments.

In an operation 312, an issuance of an amount of the secondary token may be stored. As an example, the storage of the issuance may be based on a determination that a hash of at least a portion of the first block corresponds to the key space portion allocated to the user. As an example, the first block (e.g., the content of the first block) may be provided as input to a one-way hash function (e.g., configured to output a 256-bit hash from a group of $2^{256}$ hashes or other-number-bit hash) to obtain the hash of the first block portion. The hash of the first block portion may be compared to the key space portion to determine whether the hash of the first block portion is within the key space portion allocated to the user. Based on a determination that the hash of the first block portion is within the key space portion, the amount of the secondary token may be caused to be issued, and the issuance of the amount of the secondary token may be stored on the blockchain (e.g., on one or more blocks subsequent to the first block, on a second block subsequent to the first block such that one or more blocks are between the first block and the second block, etc.). Operation 312 may be performed by a ledger update subsystem or cryptographic subsystem that is the same as or similar to ledger update subsystem 112 or cryptographic subsystem 116, in accordance with one or more embodiments FIG. 4 shows a flowchart of a method of facilitating multiple-burning-transaction-based secondary token issuance on a blockchain, in accordance with one or more embodiments.

In an operation 402, a blockchain may be stored. As an example, the blockchain may include one or more blocks. Each of the blocks may include one or more blockchain transactions. Each of the blockchain transaction may involve a primary token of the blockchain. Operation 402 may be performed by a ledger update subsystem that is the same as or similar to ledger update subsystem 112, in accordance with one or more embodiments.

In an operation 404, a blockchain transaction associated with a user may be obtained. As an example, the blockchain transaction may indicate (i) an amount of the primary token, (ii) a secondary token of the blockchain, or (iii) other transaction information. As another example, the amount of the primary token indicated by the blockchain transaction may be owned by the user. Operation 404 may be performed by a transaction subsystem that is the same as or similar to transaction subsystem 114, in accordance with one or more embodiments.

In an operation 406, the amount of the primary token (indicated by the blockchain transaction) may be caused to be burned based on the blockchain transaction. As an example, if the blockchain transaction indicates a first amount of the primary token (owned by the user) to be burned, one or more proofs of burn for the first amount of the primary token owned by the user may be performed. Additionally, or alternatively, one or more user devices (e.g., of the user) may be requested to perform the proofs of burn for the first amount of the primary token. Operation 406 may be performed by a token burning subsystem that is the same as or similar to token burning subsystem 118, in accordance with one or more embodiments.

In an operation 408, an issuance of an amount of the secondary token may be stored. As an example, the storage of the issuance may be based on a summation of multiple amounts of the primary token indicated in multiple blockchain transactions (as amounts to be burned). In one use case, for example, where the total amount of the primary token committed exceeds a difficulty level (e.g., for a given issuance of the secondary token), the difficulty for the purposes of the mining/issuance calculation may be re-set based on the summation of the total amount of the primary token committed (e.g., to be burned) in the mining attempts. Operation 408 may be performed by a ledger update subsystem or cryptographic subsystem that is the same as or similar to ledger update subsystem 112 or cryptographic subsystem 116, in accordance with one or more embodiments.

In some embodiments, the various computers and subsystems illustrated in FIG. 1 may include one or more computing devices that are programmed to perform the functions described herein. The computing devices may include one or more electronic storages (e.g., ledger database(s) 132 or other electric storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-120 or other subsystems. The processors may be programmed to execute computer program instructions by software; hardware; firmware; some combination of software, hardware, or firmware; and/ or other mechanisms for configuring processing capabilities on the processors.

It should be appreciated that the description of the functionality provided by the different subsystems 112-120 described herein is for illustrative purposes, and is not intended to be limiting, as any of subsystems 112-120 may provide more or less functionality than is described. For example, one or more of subsystems 112-120 may be eliminated, and some or all of its functionality may be provided by other ones of subsystems 112-120. As another example, additional subsystems may be programmed to perform some or all of the functionality attributed herein to one of subsystems 112-120.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: storing a blockchain comprising blocks, each of the blocks comprising blockchain transactions involving a primary token of the blockchain; obtaining a blockchain transaction associated with a user, the blockchain transaction being stored on a first block for the blockchain, the blockchain transaction indicating (i) an amount of the primary token to be burned and (ii) a secondary token of the blockchain, the amount of the primary token being owned by the user; causing, based on the blockchain transaction, the amount of the primary token owned by the user to be burned; causing, based on the blockchain transaction, a portion of a key space to be allocated to the user; and storing, based on a determination that a hash of at least a portion of the first block corresponds to the key space portion allocated to the user, an issuance of an amount of the secondary token to the user in a second block for the blockchain, the second block being subsequent the first block on the blockchain.

2. The method of embodiment 1, further comprising: obtaining a second blockchain transaction associated with a second user, the second blockchain transaction being stored on the first block for the blockchain, the second blockchain transaction indicating (i) a non-zero amount of the primary token to be burned and (ii) the secondary token of the blockchain, the non-zero amount of the primary token being owned by the second user; causing, based on the second blockchain transaction, the non-zero amount of the primary token owned by the second user to be burned; and causing, based on the second blockchain transaction, a second portion of a key space to be allocated to the second user, wherein, based on the determination that the hash of the first block portion corresponds to the key space portion allocated to the user, no issuance of the secondary token to the second user is stored on the second block for the blockchain.

3. The method of embodiment 1, further comprising: obtaining a second blockchain transaction associated with a second user, the second blockchain transaction being stored on the first block for the blockchain, the second blockchain transaction indicating (i) a non-zero amount of the primary token to be burned and (ii) the secondary token of the blockchain, the non-zero amount of the primary token being owned by the second user and equal to the first amount of the primary token owned by the first user; causing, based on the second blockchain transaction, the non-zero amount of the primary token owned by the second user to be burned; causing, based on the second blockchain transaction, a second portion of a key space to be allocated to the second user; and storing, based on a determination that the hash of the first block portion corresponds to the key space portion allocated to the user, an issuance of an non-zero amount of the secondary token to the second user in the second block for the blockchain, the non-zero amount of the secondary token issued to the second user being different than the amount of the secondary token issued to the user.

4. The method of any of embodiments 1-3, wherein the portion of the key to be allocated to the user is based on the amount of the primary token indicated in the blockchain transaction.

5. The method of any of embodiments 1-4, wherein obtaining the blockchain transaction comprises obtaining the blockchain transaction during a secondary token mining window that periodically occurs in relation to a number of solved blocks.

6. The method of any of embodiment 1-5, wherein one or more blocks are between the first block and the second block on the blockchain.

7. The method of embodiment 6, wherein the issuance of the amount of the secondary token to the user is based on a summation of the amount of the primary token indicated in the blockchain transaction and one or more other amounts of the primary token indicated in one or more other blockchain transaction being stored on the one or more blocks as amounts to be burned.

8. The method of embodiments 6 or 7, further comprising: determining a difficulty level for the issuance of the amount of the secondary token, the difficulty level being determined based on a summation of the amount of the primary token indicated in the blockchain transaction and one or more other amounts of the primary token indicated in one or more other blockchain transaction being stored on the one or more blocks as amounts to be burned, and selecting the portion of the key space to be allocated to the user based on (i) the difficulty level and (ii) the amount of the primary token indicated in the blockchain transaction.

9. The method of any of embodiments 1-8, wherein the blockchain transaction identifies a first amount of the primary token to be provided for mining the secondary token, the amount of the primary token to be burned being based on the first amount of the primary token to be provided for mining the secondary token.

10. The system of any of embodiments 1-8, wherein the blockchain transaction identifies the amount of the primary token to be burned.

11. A method comprising: storing a blockchain comprising blocks, each of the blocks comprising blockchain transactions involving a primary token of the blockchain; obtaining a blockchain transaction associated with a user, the blockchain transaction indicating (i) an amount of the primary token owned by the user and (ii) a secondary token of the blockchain; causing, based on the blockchain transaction, the amount of the primary token owned by the user to be burned; and storing an issuance of an amount of the secondary token to the user on the blockchain, the issuance of the amount of the secondary token to the user being based on a summation of the amount of the primary token indicated in the blockchain transaction and one or more other amounts of the primary token indicated in one or more other blockchain transactions being stored on one or more other blocks of the blockchain as amounts to be burned.

12. The method of embodiment 11, further comprising: obtaining a second blockchain transaction associated with a second user, the second blockchain transaction indicating (i) a non-zero amount of the primary token owned by the second user and (ii) the secondary token of the blockchain, the one or more amounts of the primary token comprising the non-zero amount of the primary token owned by the second user; and causing, based on the second blockchain transaction, the non-zero amount of the primary token owned by the second user to be burned, wherein the non-zero amount of the primary token owned by the second user is burned, but no issuance of the secondary token to the second user occurs from the second blockchain transaction.

13. The method of embodiment 11, further comprising: obtaining a second blockchain transaction associated with a second user, the second blockchain transaction indicating (i) a non-zero amount of the primary token owned by the second user that is equal to the first amount of the primary token owned by the first user and (ii) the secondary token of the blockchain; causing, based on the second blockchain transaction, the non-zero amount of the primary token owned by the second user to be burned; and storing an issuance of a non-zero amount of the secondary token to the second user on the blockchain, the non-zero amount of the secondary token issued to the second user being different than the amount of the secondary token issued to the user.

14. The method of any of embodiments 11-3, further comprising: causing, based on the blockchain transaction, a portion of a key space to be allocated to the user, wherein storing the issuance of the amount of the secondary token to the user comprises storing, based on a determination that a hash of at least a portion of a first block of the blockchain corresponds to the key space portion allocated to the user, the issuance of the amount of the secondary token to the user on the blockchain.

15. The method of embodiment 14, wherein the portion of the key to be allocated to the user is based on the amount of the primary token indicated in the blockchain transaction.

16. The method of any of embodiments 11-15, wherein obtaining the blockchain transaction comprises obtaining the blockchain transaction during a secondary token mining window that periodically occurs in relation to a number of solved blocks.

17. The method of any of embodiments 11-16, wherein the blockchain transaction identifies a first amount of the primary token to be provided for mining the secondary token, the amount of the primary token to be burned being based on the first amount of the primary token to be provided for mining the secondary token.

18. The method of any of embodiments 11-16, wherein the blockchain transaction identifies the amount of the primary token to be burned.

19. A tangible, non-transitory, machine-readable medium storing instructions that when executed by a data processing apparatus cause the data processing apparatus to perform operations comprising those of any of embodiments 1-18.

20. A system, comprising: one or more processors; and memory storing instructions that when executed by the processors cause the processors to effectuate operations comprising those of any of embodiments 1-18.

What is claimed is:

1. A system for facilitating probabilistic secondary token issuance on a blockchain based on a burning of a primary token of the blockchain, the system comprising:
  one or more network nodes comprising one or more processors programmed with computer program instructions that, when executed, cause the one or more network nodes to:
    store a blockchain comprising blocks, each of the blocks comprising blockchain transactions involving a primary token of the blockchain;
    obtain a blockchain transaction associated with a user, the blockchain transaction being stored on a first block for the blockchain, the blockchain transaction indicating (i) an amount of the primary token to be burned and (ii) a secondary token of the blockchain, the amount of the primary token being owned by the user;
    cause, based on the blockchain transaction, the amount of the primary token owned by the user to be burned;
    determine a difficulty level related to issuance of an amount of the secondary token, the difficulty level being determined based on a summation of the amount of the primary token indicated in the blockchain transaction and one or more other amounts of the primary token indicated in one or more other blockchain transactions being stored on one or more blocks between the first block and a second block for the blockchain as amounts to be burned;
    select a portion of a key space to be allocated to the user based on (i) the difficulty level and (ii) the amount of the primary token indicated in the blockchain transaction;
    cause, based on the selection, the key space portion to be allocated to the user; and
    store, based on a determination that a hash of at least a portion of the first block corresponds to the key space portion allocated to the user, the issuance of the amount of the secondary token to the user in the second block for the blockchain, the second block being subsequent the first block on the blockchain.

2. The system of claim 1, wherein the one or more network nodes are caused to:
  obtain a second blockchain transaction associated with a second user, the second blockchain transaction being stored on the first block for the blockchain, the second blockchain transaction indicating (i) a non-zero amount of the primary token to be burned and (ii) the secondary token of the blockchain, the non-zero amount of the primary token being owned by the second user;
  cause, based on the second blockchain transaction, the non-zero amount of the primary token owned by the second user to be burned; and
  cause, based on the second blockchain transaction, a second portion of the key space to be allocated to the second user,
  wherein, based on the determination that the hash of the first block portion corresponds to the key space portion allocated to the user, no issuance of the secondary token to the second user is stored on the second block for the blockchain.

3. The system of claim 1, wherein the one or more network nodes are caused to:
obtain a second blockchain transaction associated with a second user, the second blockchain transaction being stored on the first block for the blockchain, the second blockchain transaction indicating (i) a non-zero amount of the primary token to be burned and (ii) the secondary token of the blockchain, the non-zero amount of the primary token being owned by the second user and equal to the first amount of the primary token owned by the first user;
cause, based on the second blockchain transaction, the non-zero amount of the primary token owned by the second user to be burned;
cause, based on the second blockchain transaction, a second portion of the key space to be allocated to the second user; and
store, based on the determination that the hash of the first block portion corresponds to the key space portion allocated to the user, an issuance of an non-zero amount of the secondary token to the second user in the second block for the blockchain, the non-zero amount of the secondary token issued to the second user being different than the amount of the secondary token issued to the user.

4. The system of claim 1, wherein obtaining the blockchain transaction comprises obtaining the blockchain transaction during a secondary token mining window that periodically occurs in relation to a number of solved blocks.

5. The system of claim 1, wherein the blockchain transaction identifies a first amount of the primary token to be provided for mining the secondary token, the amount of the primary token to be burned being based on the first amount of the primary token to be provided for mining the secondary token.

6. The system of claim 1, wherein the blockchain transaction identifies the amount of the primary token to be burned.

7. A method being implemented by a computer system that comprises one or more processors executing computer program instructions that, when executed, perform the method, the method comprising:
storing a blockchain comprising blocks, each of the blocks comprising blockchain transactions involving a primary token of the blockchain;
obtaining a blockchain transaction associated with a user, the blockchain transaction indicating (i) an amount of the primary token owned by the user and (ii) a secondary token of the blockchain, wherein the blockchain transaction identifies the amount of the primary token as a given amount to be burned;
causing, based on the blockchain transaction, the amount of the primary token owned by the user to be burned; and
storing an issuance of an amount of the secondary token to the user on the blockchain, the issuance of the amount of the secondary token to the user being based on a summation of the amount of the primary token indicated in the blockchain transaction and one or more other amounts of the primary token indicated in one or more other blockchain transactions being stored on one or more other blocks of the blockchain as amounts to be burned.

8. The method of claim 7, further comprising:
obtaining a second blockchain transaction associated with a second user, the second blockchain transaction indicating (i) a non-zero amount of the primary token owned by the second user and (ii) the secondary token of the blockchain; and
causing, based on the second blockchain transaction, the non-zero amount of the primary token owned by the second user to be burned,
wherein the non-zero amount of the primary token owned by the second user is burned, but no issuance of the secondary token to the second user occurs from the second blockchain transaction.

9. The method of claim 7, further comprising:
obtaining a second blockchain transaction associated with a second user, the second blockchain transaction indicating (i) a non-zero amount of the primary token owned by the second user that is equal to the first amount of the primary token owned by the first user and (ii) the secondary token of the blockchain;
causing, based on the second blockchain transaction, the non-zero amount of the primary token owned by the second user to be burned; and
storing an issuance of a non-zero amount of the secondary token to the second user on the blockchain, the non-zero amount of the secondary token issued to the second user being different than the amount of the secondary token issued to the user.

10. The method of claim 7, further comprising:
causing, based on the blockchain transaction, a portion of a key space to be allocated to the user,
wherein storing the issuance of the amount of the secondary token to the user comprises storing, based on a determination that a hash of at least a portion of a first block of the blockchain corresponds to the key space portion allocated to the user, the issuance of the amount of the secondary token to the user on the blockchain.

11. The method of claim 10, wherein the portion of the key space to be allocated to the user is based on the amount of the primary token indicated in the blockchain transaction.

12. The method of claim 7, wherein obtaining the blockchain transaction comprises obtaining the blockchain transaction during a secondary token mining window that periodically occurs in relation to a number of solved blocks.

13. The method of claim 7, wherein the blockchain transaction identifies a first amount of the primary token to be provided for mining the secondary token, the amount of the primary token to be burned being based on the first amount of the primary token to be provided for mining the secondary token.

14. The method of claim 7, further comprising:
determining a difficulty level related to the issuance of the amount of the secondary token, the difficulty level being determined based on the summation of the amount of the primary token indicated in the blockchain transaction and the one or more other amounts of the primary token; and
selecting a portion of a key space to be allocated to the user based on (i) the difficulty level and (ii) the amount of the primary token indicated in the blockchain transaction,
wherein the issuance of the amount of the secondary token to the user is based on the key space portion be allocated to the user.

15. A system comprising:
one or more network nodes comprising one or more processors programmed with computer program instructions that, when executed, cause the one or more network nodes to:

store a blockchain comprising blocks, each of the blocks comprising blockchain transactions involving a primary token of the blockchain;

obtain a blockchain transaction associated with a user, the blockchain transaction indicating (i) an amount of the primary token owned by the user and (ii) a secondary token of the blockchain;

cause, based on the blockchain transaction, the amount of the primary token owned by the user to be burned; and causing, based on the blockchain transaction, a portion of a key space to be allocated to the user;

obtaining a second blockchain transaction associated with a second user, the second blockchain transaction indicating (i) a non-zero amount of the primary token owned by the second user and (ii) the secondary token of the blockchain;

causing, based on the second blockchain transaction, the non-zero amount of the primary token owned by the second user to be burned; and cause, based on the second blockchain transaction, a second portion of the key space to be allocated to the second user; and store, based on a determination that a hash of at least a portion of a first block of the blockchain corresponds to the key space portion allocated to the user, an issuance of an amount of the secondary token to the user on the blockchain, the issuance of the amount of the secondary token to the user being further based on a summation of the amount of the primary token indicated in the blockchain transaction and one or more other amounts of the primary token indicated in one or more other blockchain transactions being stored on the blockchain as amounts to be burned, wherein, based on the determination that the hash of the first block portion corresponds to the key space portion allocated to the user, no issuance of the secondary token to the second user occurs from the second blockchain transaction.

16. The system of claim 15, wherein the blockchain transaction identifies the amount of the primary token to be burned.

* * * * *